United States Patent [19]

Rogers, Jr. et al.

[11] Patent Number: 4,770,235

[45] Date of Patent: Sep. 13, 1988

[54] NOZZLE DAM LOCKING PIN ASSEMBLY

[75] Inventors: James W. Rogers, Jr., Chattanooga; Lee A. Tade, III, Hixson, both of Tenn.

[73] Assignee: Combustion Engineering, Inc., Windsor, Conn.

[21] Appl. No.: 863,755

[22] Filed: May 16, 1986

[51] Int. Cl.⁴ .............................................. F28F 7/00
[52] U.S. Cl. ...................................... 165/76; 138/93; 220/323; 376/204; 376/277
[58] Field of Search ................... 138/93; 220/232, 315, 220/323; 376/203, 204, 277; 165/71, 76

[56] References Cited

U.S. PATENT DOCUMENTS

| | | | |
|---|---|---|---|
| 81,345 | 8/1868 | Cook | 220/323 |
| 2,843,154 | 7/1958 | Hosking | 220/239 |
| 3,101,641 | 8/1963 | Walker et al. | |
| 3,834,422 | 9/1974 | Larson | 138/93 |
| 4,320,851 | 3/1982 | Montoya | 220/323 |
| 4,482,076 | 11/1984 | Wentzell | 138/93 |
| 4,483,457 | 11/1984 | Schukei et al. | 138/93 |
| 4,518,015 | 5/1985 | Fischer | 138/93 |
| 4,591,068 | 5/1986 | Tolino et al. | 376/204 |

Primary Examiner—Deborah L. Kyle
Assistant Examiner—Richard W. Wendtland
Attorney, Agent, or Firm—John H. Mulholland

[57] ABSTRACT

A nuclear steam generator isolation dam (28) locking pin (36) is slidably mounted and spring (52) biased in an axial bore (42,44) of a body (40) press fit in a dam boss (32). The pin (36) is actuated by a lever (54) in a slot (54,58,62) for selective lock-in, lock-out and spring biased travel for seeking its keeper (27) in the wall (26) of the nozzle.

8 Claims, 3 Drawing Sheets

NOZZLE DAM LOCKING PIN ASSEMBLY

FIELD OF THE INVENTION

The present invention relates to an improvement in nozzle dams for steam generators of the type in association with a conventional nuclear power generating system. Nozzle dams are used to provide a temporary liquid tight seal in a nozzle of a steam generator to isolate the generator from the nuclear reactor with which it is associated.

BACKGROUND OF THE INVENTION

To employ a plug to affect blockage of a normally open flow passage for repair purposes has been known in the prior art in connection with many types of fluid flow systems. Examples of expansible plugs or dams of the prior art may be found in U.S. Pat. Nos. 2,843,154; 3,834,422; and, 4,518,015. From these concepts, which are generally applicable to flow passageways, nozzle plugs for steam generators of conventional nuclear power generating systems have developed. An example of such a nozzle plug for effecting a temporary blockage of a passage into or out of a nuclear power system steam generator will be found in U.S. Pat. No. 4,482,076 to Timothy H. Wentzell, assigned to Combustion Engineering, Inc., the assignee of the instant invention.

Periodically, there arises a need to conduct maintenance on, and to effect minor repairs of, the internal components of the steam generator. To accomplish such tasks, it is necessary for one or more persons to physically enter the steam generator. Ingress and egress to and from the steam generator by such persons is accomplished through suitable means such as, for example, an access port or manway. While such persons are working in the steam generator, it is desirable that a blockage of the inlet and outlet nozzle of the steam generator be effected to ensure that there will be no fluid flow through the steam generator which might physically imperil the people working therein.

One such design of a nozzle plug for a nuclear steam generator is disclosed in the U.S. Pat. No. 4,482,076 mentioned above. In that design, a plurality of plate sections are assembled within the steam generator to form the plug or nozzle dam. U.S. Pat. No. 4,483,457 to Schukei and Tade discloses an improvement over the Wentzell patent in that it provides for the sections of the nozzle dam to be hinged together.

Both of these patents teach dams which rely upon locking pins which enter inserts in holes in the side wall of the nozzle to hold the dams in place. The pins are tethered on lanyards and loosely attached to the dam sections until the dam is placed in its approximate final position in the nozzle. They are then manually inserted through holes in bosses on the dam structure and into the inserts. The process of finally aligning the dam boss holes, insert holes and tethered pins, usually is difficult and requires two men. Invariably the lanyards tangle, slowing the operation. Two independent nozzle dams are usually used in each steam generator.

SUMMARY OF THE INVENTION

The improved nozzle dam locking pin assembly of the invention is permanently attached to the nozzle dam by a press fit. A close tolerance hole drilled in each pin boss of the dam has a cylindrical body portion of a pin assembly pressed into the hole to form the pressed fit. Thus, the pin assembly becomes part of the dam with no bothersome lanyards or other temporary pin attaching structure.

The locking pin assembly for securing a nozzle dam in position within a steam generator nozzle includes, in addition to the elongated body, an axial bore in the body having a large diameter portion at one end and a reduced diameter portion at the other end. An elongated pin is slidably mounted in the bore and includes corresponding large and reduced diameter portions. A spring means biases the pin so that its larger end projects radially outwardly of the dam and body from the large bore portion towards openings in said steam generator nozzle. A transverse lever threadedly or otherwise fixed to the pin travels in a slot which permits the pin to be secured in either the locked or the retracted position. The retracted position is for initial insertion of the dam into the nozzle.

Once the dam is in its approximate position, the lever is released and the outward bias of the spring automatically engages the pin in the inserts upon alignment. The pin lever is then turned into the locked position of the slot to secure the pins in the inserts until the dams are to be removed from the nozzles. The end of the pin is a curved surface, which is preferably a portion of the sphere, to enhance this self-seating of the spring biased pin in the holes of the inserts. The nozzle dams are removed by unlocking the pins and retracting the pin and lever into a position where a slot portion acts on the lever to hold it.

Accordingly, it is an object of the present invention to provide an improved nozzle dam locking pin assembly for use in isolating a steam generator from a nuclear reactor.

DETAILED DESCRIPTION OF THE PREFERRED EMBODIMENT

Figure 1:
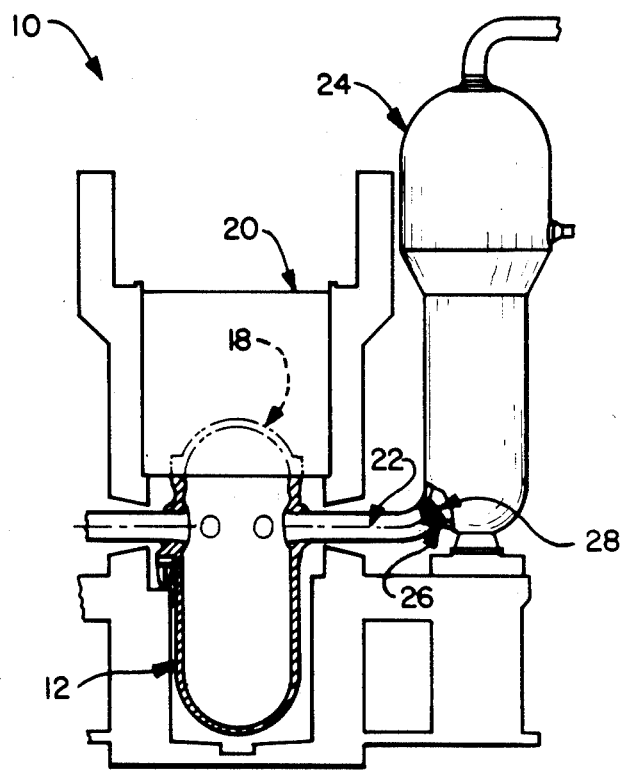
FIG. 1 is a schematic elevational view, with portions broken away, of a conventional nuclear steam generator system having two nozzle dams of the type with which the improved nozzle dam locking pin assemblies of the invention may be used.
Figure 2:
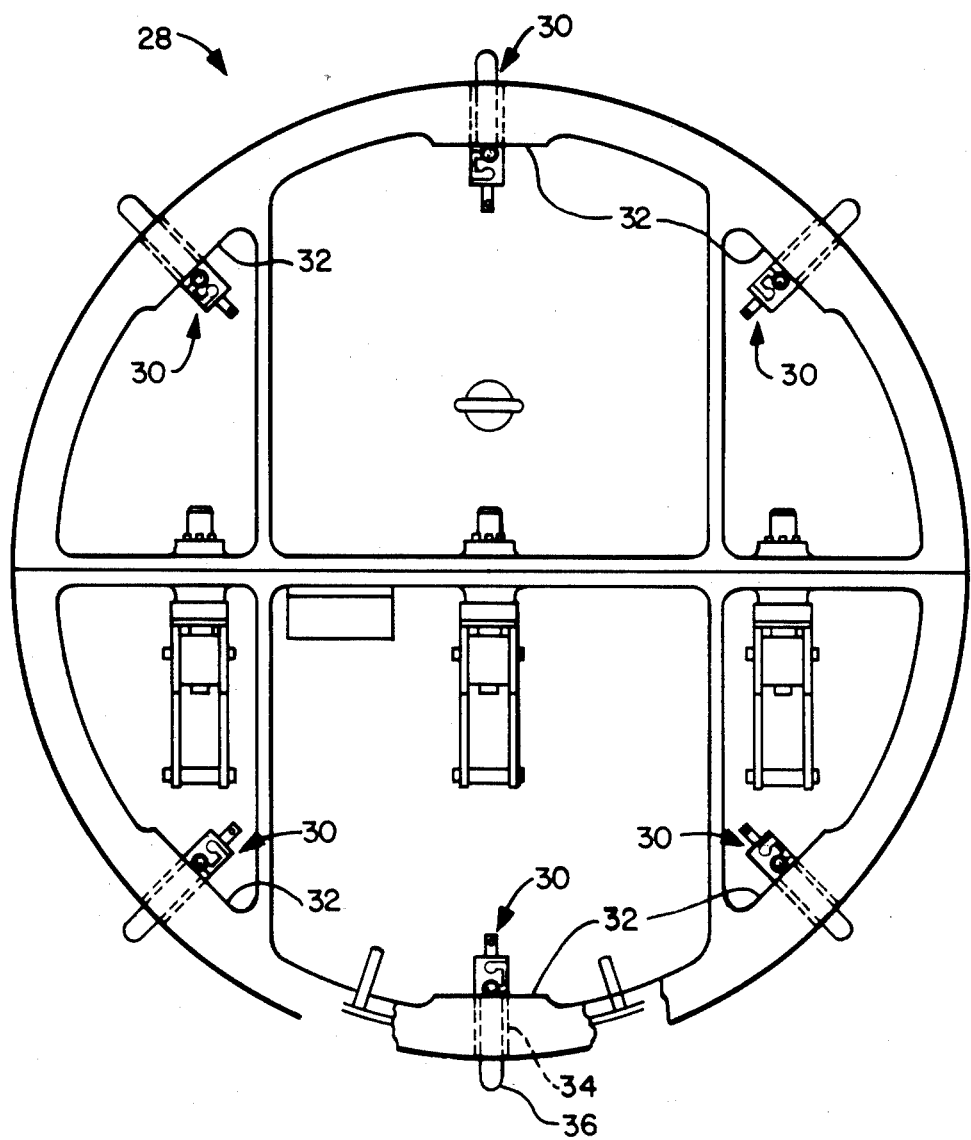
FIG. 2 is a front elevational view of a nozzle dam which includes the improved nozzle dam locking pin assemblies of the invention.

A conventional nuclear powered generating system is schematically illustrated in FIG. 1 and is generally designated by the numeral 10. The system 10 includes a reactor vessel 12 which surrounds a nuclear core (not shown). The reactor vessel 12 is shown with a closure head 18 removed, but illustrated in phantom at its top end. This is because the system 10, as shown in FIG. 1, is in a condition which includes the provision of a pool 20 for protection against radiation of the reactor core during refueling. The refueling pool 20 creates a head of pressure in the flow passageway 22 communicating the reactor vessel 12 with a steam generator 24 through a nozzle 26. Blocking the nozzle 26, are two nozzle dams 28, both of which are pinned in their fluid flow preventing position in the nozzle 26 by means of the improved nozzle dam locking pin assemblies 30 of the instant invention.

The nozzle dams 28 may be of several alternative constructions of the type illustrated in the previously mentioned U.S. patents, for example, but in each case they will include a plurality of pin bosses 32 each having a bore 34 into which a novel pin assembly 30 is press fit.

Figure 3:
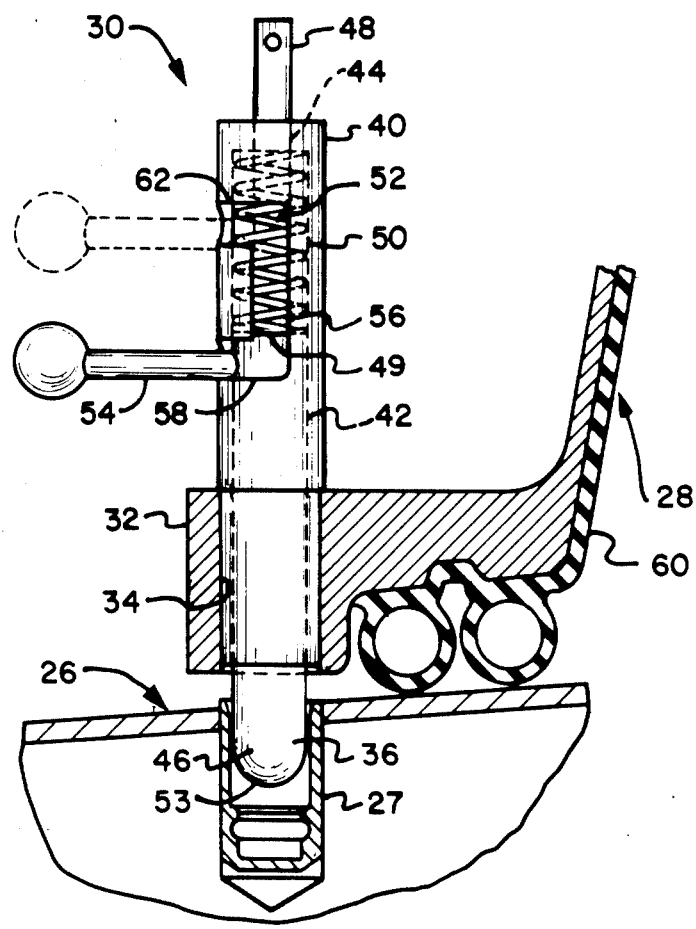
FIG. 3 is a view taken along the line 3—3 of FIG. 2.

As best seen in FIG. 3, the nozzle 26 is an annular tapered surface having inserts 27 mounted in the wall thereof for receipt of pins 36 of a plurality of pin assemblies 30. Each pin 36 is slidably mounted in an elongated body 40 of a pin assembly 30. The elongated body 40 has an outer cylindrical dam engaging surface portion and a central axial bore made up a first and large diameter bore portion 42 at one end of the bore and a second and reduced diameter bore portion 44 at the opposite end of the bore. The elongated pin 36 slidably mounted in the bore includes a first and large diameter pin portion 46 and a second and reduced diameter pin portion 48. A shoulder 49 lies between pin portions 46 and 48. The enlarged diameter pin portion 46 rides in the first enlarged diameter bore portion 42 and the second and reduced diameter pin portion 48 at the opposite end of said pin 36 is slidably mounted within the reduced diameter bore portion 44.

Adjacent the reduced diameter bore portion 44, in bore portion 42, is a bore chamber 50. A compression spring means 52 within chamber 50 surrounds the reduced diameter pin portion 48 and biases the pin 36 toward a position of projection from the end of the body 40 adjacent its large diameter bore portion 42. The projecting pin portion 36 has a curved surface 53 on its end which is preferably of spherical shape.

With the biasing spring 52 urging the pin 36 outwardly, as soon as the pin 36 comes into alignment with the bore in the insert 27, the spherical surface 53 guides pin 36 into the bore and locks the dam 28 in proper position. This makes the operation of locking a dam 28 in position capable of being performed by a single man.

The body 40 of the locking pin assembly 30 includes a transverse slot which communicates the bore portion 42 with the outside of the body. A lever or handle 54, which for ease of assembly and manufacture may be threadedly secured to the pin 36, extends outwardly through the slot. When the pin 36 is seated in the insert 27 such that the dam 28 is in the proper position, the lever 54 is moved from an axial travel portion 56 of the slot in the sidewall of the body 40 to a circumferentially extending portion 58 of the slot. In this position, with the lever 54 in the circumferential portion 58 of the slot the pin cannot move axially and is locked in projecting condition within the insert 27. When all of the pins are thus seated, the diaphragm and outer annular seal member 60 prevent flow of the refueling pool 20 through the passage way 22 into the steam generator 24.

To remove the pins so that the dam 28 can be removed from the nozzle 26, the lever 54 is moved along the circumferential slot portion 58 until it reaches the axial portion 56 of the slot. The lever 54 is then moved axially to retract the pin 36 from the insert 27. At the end of its axial travel along axial portion 56, another circumferential slot portion 62 is traversed by the lever 54. This secures the lever from axial travel with the pin 36 retracted into the body 40.

Thus, it will be seen that the new and improved pin assembly automatically engages the hole in the nozzle insert upon alignment therewith. Moreover, biased by means of the spring, the pin is allowed to travel freely inwardly and outwardly, seeking the insert holes, as long as the lever is in the activated position within the axial portion 56 of the slot in body member 40. After the nozzle dam locking pins engage the holes, the handle is moved from the axial travel slot portion into the locked position within the circumferential slot portion 58.

We claim:

1. In a nuclear steam generator isolation dam locking pin assembly for securing a dam having an outer annular seal member in position within a steam generator nozzle with pin receiving openings, the improvement comprising:
    an elongated body having an outer dam engaging surface portion fixedly secured to said dam adjacent said outer annular seal member;
    an axial bore in said body;
    a first and large diameter bore portion at one end of said bore;
    a second and reduced diameter bore portion at the opposite end of said bore;
    an elongated pin slidably mounted in said bore and including a first and large diameter pin portion in slidable engagement with said first and large diameter bore portion and a second and reduced diameter portion at the opposite end of said pin in slidable engagement with said second and reduced diameter bore portion;
    means for biasing said pin and said first and large diameter pin portion axially and radially outwardly of the dam and adjacent said outer annular seal member toward a position of projecting from the end of said body bore portion toward openings in said steam generator nozzle; and
    means for securing said pin and said first and large diameter pin portion in a position of retraction within said first and large diameter bore portion against said means for biasing said pin.

2. The locking pin assembly of claim 1 in which the end of the pin adjacent the first and large diameter bore portion defines a curved surface.

3. The locking pin assembly of claim 1 in which the means biasing said pin are spring means surrounding the second and reduced diameter portion of said pin and acting on a shoulder on said pin.

4. The locking pin assembly of claim 1 in which the outer dam engaging surface portion is cylindrical and is fixedly secured by means of a press fit within an opening in an isolation dam.

5. The locking pin assembly of claim 1 in which the means for securing said pin includes a lever secured to said pin and extending outwardly through a transverse slot in said body communicating said bore with the outside of said body, said slot having an axial portion sufficient in length to permit axial travel of said lever as said pin moves axially to project or to retract and said slot further including at least one circumferential portion sufficient in length to permit rotational travel of said lever to a position which prevents axial travel of the lever and the pin.

6. The locking pin assembly of claim 5 in which the circumferential portion of the slot is adjacent the end of the axial portion of the slot remote from the end of the first and large diameter bore portion from which the first and large diameter portion of the pin projects.

7. The locking pin assembly of claim 5 in which the circumferential portion of the slot is adjacent the end of the axial portion of the slot remote from the end of the pin adjacent the second and reduced diameter bore portion.

8. The locking pin assembly of claim 5 in which two circumferential portions of the slot are provided, one adjacent each end of the axial portion of the slot.

* * * * *